United States Patent [19]

Cool

[11] Patent Number: 5,218,632
[45] Date of Patent: Jun. 8, 1993

[54] FLEXIBLE CALL DETAIL RECORDING SYSTEM

[75] Inventor: Anna M. Cool, Plano, Tex.

[73] Assignee: Telefonaktiebolaget L M Ericsson, Sweden

[21] Appl. No.: 778,398

[22] Filed: Oct. 16, 1991

[51] Int. Cl.[5] .................... H04M 15/04; H04M 15/12
[52] U.S. Cl. ................................. 379/126; 379/112; 379/119
[58] Field of Search ............... 379/114, 112, 115, 116, 379/119, 120, 126

[56] References Cited

U.S. PATENT DOCUMENTS

| | | | |
|---|---|---|---|
| 4,090,034 | 5/1978 | Moylan | 179/7.1 |
| 4,525,601 | 6/1985 | Barnich et al. | 179/7 |
| 5,003,584 | 3/1991 | Benyacar et al. | 379/119 |
| 5,008,929 | 4/1991 | Olsen et al. | 379/112 |
| 5,027,388 | 6/1991 | Bradshaw et al. | 379/112 |
| 5,048,079 | 9/1991 | Harrington et al. | 379/112 |

Primary Examiner—Stafford D. Schreyer
Attorney, Agent, or Firm—Johnson & Gibbs

[57] ABSTRACT

A telecommunications billing record software system which permits the telephone administration which is operating the exchange to interface with and define the criteria for constructing and/or modifying the decision tables used to decide whether or not to generate a billing record for each particular call. In addition, the administration can also define the criteria for specifying the billing record data to be included within the billing records which are generated and the location to which the record is output.

25 Claims, 6 Drawing Sheets

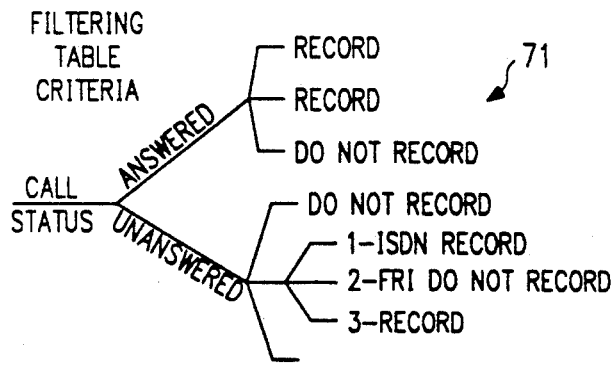
FIG. 6
FIG. 7
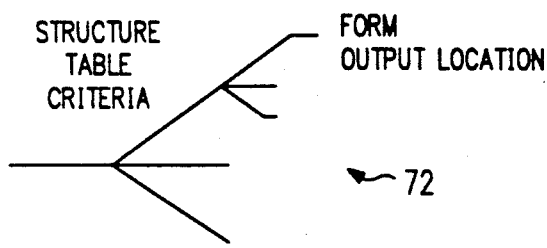
FIG. 4
FIG. 5
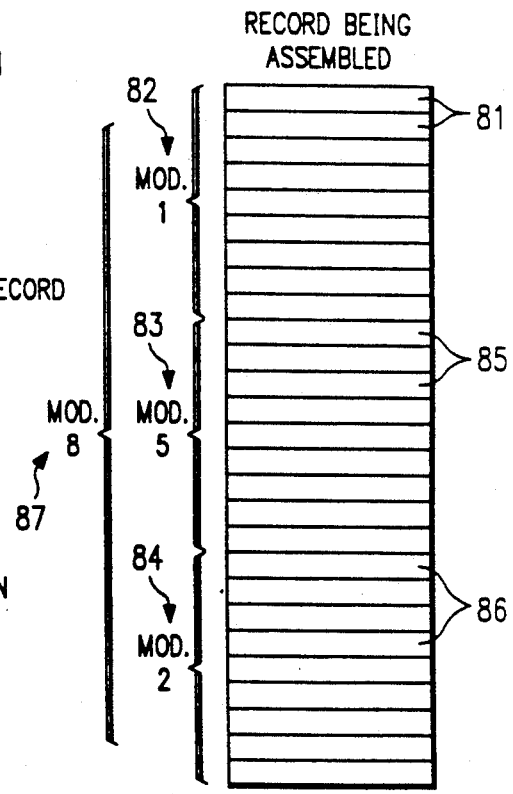
FIG. 8

FLEXIBLE CALL DETAIL RECORDING SYSTEM

BACKGROUND OF THE INVENTION

1. Field of the Invention

The invention relates to telecommunications billing and more particularly, to a billing record system which permits a telephone administration to readily define the criteria for constructing and modifying the decision tables used to decide whether to generate a billing record for each particular call as well as the billing record data to be included therein and the location to which the record is output.

2. History of the Prior Art

It is a major objective of the telephone industry to continually improve existing telephone services and to introduce new services as improvements in technology allow. It is also highly desirable for a telephone service provider to be able to bill customers for the use of particular features and to provide a system for billing which allows a telephone administration to specify the particular services for which a customer will be billed.

Incorporated within modern stored program control (SPC) switching exchanges are facilities for gathering all of the data related to each telephone call and making a decision as to whether or not a billing record will be prepared based upon criteria associated with the recorded call data. If a billing record is to be rendered for the telephone service provided by the exchange during the call, the exchange includes facilities for generating that billing record in accordance with predetermined charging criteria and then assembling the set of data associated with that call in a selected format. The assembled billing record is then output to a predetermined location such as an automatic message accounting (AMA) block within the exchange.

Prior art software within the charging system of an SPC exchange is generally hard coded to incorporate a fixed preselected billing specification which determines whether or not a billing record will be rendered in accordance with a billing policy determining body such as Bellcore in the U.S. and the national telephone administration in other countries. In addition, the prior art hard coded charging system software incorporates a local switching system generic requirement (LSSGR) which specifies the particular criteria, such as number of calls, length of calls, special services invoked during calls, etc., based upon which a customer utilizing the exchange will be charged. In general, when a call is placed within the exchange, the charging system software collects all of the data associated with the call such as the A-number, B-number, time that the call was placed, time that the call was terminated, etc. and stores it in memory. Thereafter, at the completion of the call, these data are analyzed and a decision is made by the hard coded billing specifications as to whether or not a billing record will be prepared depending upon, for example, whether or not the call was answered. If a billing record is not to be prepared, the stored call related data is simply purged and the next call is processed. If a billing record is to be prepared, then the hard coded software processes the stored data related to the call in accordance with, for example, the LSSCR criteria, and produces a billing record. The system only utilizes the items of stored data which are called for by the coded charging criteria and disposes of the remainder of the data.

A principal problem associated with the prior art approach of using standardized hard coded billing criteria and charging software is that when new features are introduced into the exchange, they cannot be charged for without removing the old billing software and installing new software which incorporates code including criteria for charging for the new features. Writing and installing new billing software is expensive and time consuming and very often results in a long time lag between the time when the feature is introduced and when it can be charged for by the telephone administration.

In addition, in European exchanges where each national or regional telephone administration often has different criteria for both initiating a billing record as well as preparing the specific chargeable components of the billing record, hard coded billing software requires numerous versions each adapted to a particular market and a particular telephone administration associated with that market. This greatly increases the costs of providing such software and delays the time within which it can be provided to individual exchanges.

Certain billing systems, such as that shown in U.S. Pat. No. 5,003,584 to Benyacar et al have attempted to allow modification of billing parameters by a sponsor of a value added communications service. However, such systems simply allow add on modification of specific billing parameters within individual value added service sponsor records. Such systems are highly limited in their applicability, for example to 900 calls, and do not include full flexibility in the modification of telecommunications billing systems.

It would be of great advantage to allow each local telephone administration to be able to modify both the billing decision criteria, as well as the billing record format to be used as the charging specification criteria on a real time basis. The system of the present invention provides such an advantage.

SUMMARY OF THE INVENTION

In one aspect, the present invention includes providing a billing record system for use within the charging system of a stored program controlled communications exchange operated by a telecommunications administration in which the charging system performs charging analysis and produces a collection of data from each call within the exchange and in which a call data filtering structure is constructed to include a filtering table for reaching a decision as to whether or not a call record is to be produced for each call based upon conditions determined by the call data. The telecommunications administration operating the exchange is enabled to specify the criteria used to modify the filtering table in accordance with specific conditions selected by the administration. A separate billing record is created for each call when the data satisfies the conditions specified within the filtering table.

In another aspect, the present invention contemplates constructing a call data structure which also includes a structure table for specifying the particular structure to be used for each call record to be produced based upon conditions determined by the data associated with each call. The telecommunications administration operating the exchange is also enabled to specify the criteria used to modify the structure table in accordance with specific conditions selected by the administration.

In a further aspect, the present invention includes providing a billing record system for use within the charging system of a stored program controlled communications exchange in which a call data formatting assembler is constructed for assembling the data related to each call for which a record is to be created into a record comprising an array of modules having a specific structure determined from a structure table which includes a plurality of field tables and a plurality of module tables. Each field table specifies a plurality of fields comprising call data available to be included within a billing record. Each module table specifies a plurality of field tables available for use within a call record to be assembled. The telecommunications administration operating the exchange is enabled to specify criteria to the formatting assembler to modify the field tables and the module tables in accordance with specific requirements selected by the administration.

In a still further aspect of the invention, a billing record system is provided for use within the charging system of a stored program controlled communications exchange wherein the structure table of the call data filtering structure is provided with an indication of the location to which each billing record to be created is to be output by the charging system and the output location indicator from the structure table is stored within an output locator table. Each assembled billing record is sent to the location specified within the output locator table.

In yet still another aspect, the present invention provides a billing record within the charging system of a stored program controlled communications exchange operated by a telecommunications administration in which charging analysis is performed on each call and data and pointers to first and second locations are produced based upon the type of call. The data produced from the charging analysis of a call is stored and a set of criteria is obtained from the first location specified by the pointer. Filtering analysis is performed based upon the set of criteria to determine whether or not a charging record should be produced for that call. In response to a decision that a charging record should be produced for the call, the structure for the record is determined from a structure table stored at the second location indicated by the pointers. A charging record is assembled from the stored call data in the format specified by the structure table and the telecommunications administration operating the exchange is enabled to modify the set of criteria stored at the first location for determining whether or not a charging record should be produced for the call.

BRIEF DESCRIPTION OF THE DRAWINGS

For a more complete understanding of the present invention and for further objects and advantages thereof, reference may now be had to the following description taken in conjunction with accompanying drawing, in which:

FIG. 4 is an illustrative diagram of filtering criteria used in the system of the present invention;

FIG. 5 is an illustrative diagram of structure criteria used in the system of the present invention;

FIG. 6 is an illustrative diagram of a field table used in the system of the present invention;

FIG. 7 is an illustrative diagram of a module table used in the system of the present invention;

FIG. 8 is an illustrative diagram of a billing record assembled in accordance with the system of the present invention;

DETAILED DESCRIPTION

Figure 1:
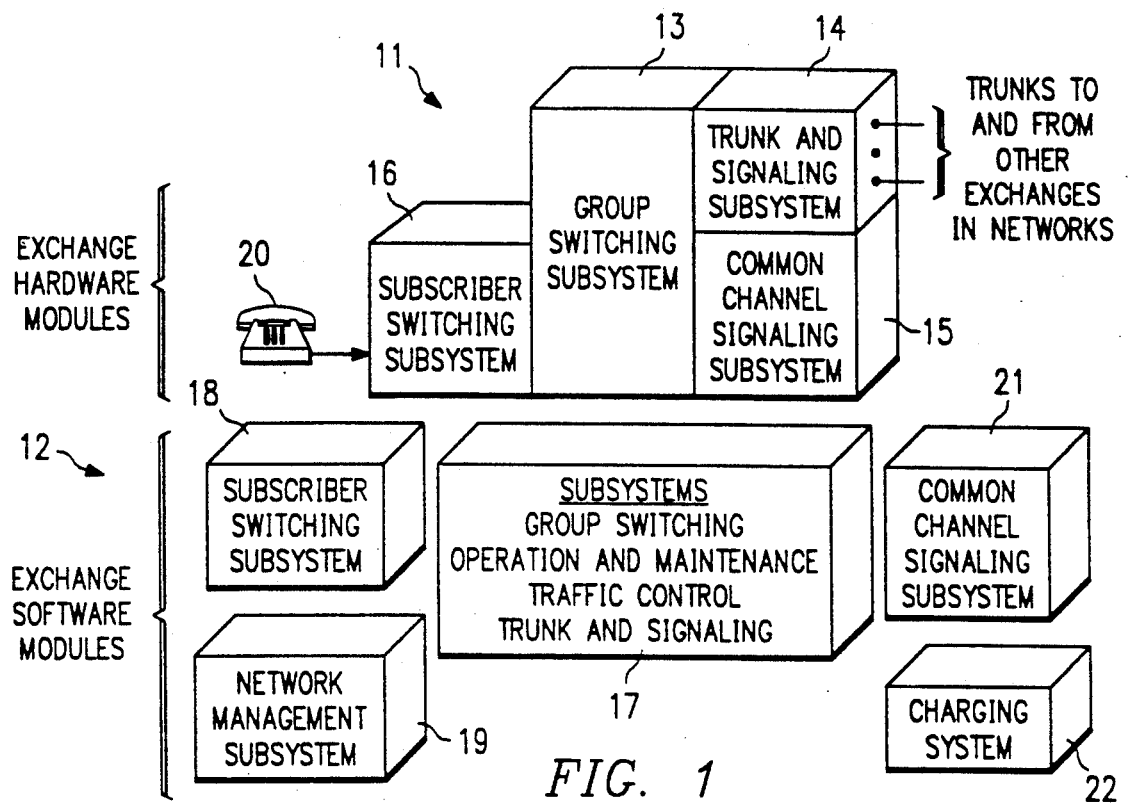
FIG. 1 is a block diagram of the hardware and software modules contained within an illustrated SPC exchange.

Referring first to FIG. 1, there is shown a block diagram of an illustrative stored program control (SPC) switching system within which a charging system incorporating the system of the present invention may be incorporated. By way of illustration, the exchange of FIG. 1 may be of the type manufactured by Telefonaktiebolaget LM Ericsson and referred to as the "AXE" exchange, an early version of which is disclosed in the article by Mats Eklund, et al, entitled "AXE 10-System Description" published in *Ericsson Review*, No. 2, 1976, which is hereby incorporated herein by reference. The exchange of FIG. 1 is divided generally into two parts. The first portion 11, which includes both hardware and software, is shown in the upper part of FIG. 1 and a second portion 12, which includes only central software, is shown in the lower part of FIG. 1. A third regional software portion is not illustrated in FIG. 1. Portion 11 includes a group switching subsystem 13 of both hardware and software which sets up, supervises, and clears connections through the group switch. The selection of a path through the switch takes place within the software of the subsystem. A trunk and signalling subsystem 14, also made up of both hardware and software, handles the signalling over and the supervision of connections made to other exchanges in the network. A common channel signalling subsystem 15, also made up of both software and hardware, contains the functions for signalling, routing, supervision and correction of messages sent between exchanges in accordance with established protocol In case the exchange of FIG. 1 is a local exchange, it would include a subscriber switching subsystem 16, which also is made up of both hardware and software, which handles traffic to and from subscribers 20 connected to the exchange.

The software modules 12 of the exchange of FIG. 1 includes one block 17 comprising of plurality of software systems which consist of the group switching subsystem, an operations and maintenance subsystem, a traffic control subsystem, and a trunk and signalling subsystem. The function of the software of the group switching subsystem was described above in connection with module 13. The operations and maintenance subsystem function is to permit various functions related to statistics and supervision within the exchange, while the traffic control subsystem includes the set up, supervision and clearing of calls, the selection of outgoing routes, the analysis of incoming digits, and the storage of subscriber categories. The function of the trunk and signalling subsystem software was described above in connection with module 14. The software portion 12 also includes a subscriber switching subsystem 18 which handles traffic to and from subscribers connected to the exchange, a network management subsystem 19 which supervises traffic flow through the exchange and introduces temporary changes in that flow, a common channel signalling subsystem 21, described above in connection with module 15, and a charging subsystem 22 which handles call metering, call data collection, and billing functions as will be further described below.

Figure 2:
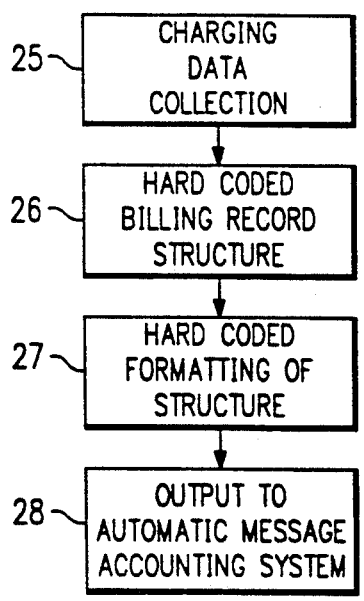
FIG. 2 is a block diagram of a prior art billing structure.

Referring next to FIG. 2, a portion of the software associated with the exchange charging system is shown as such software is configured in the prior art. There it is illustrated that charging data is collected by a charging data collection block 25 and forwarded into a hard coded billing structure 26 followed by a hard coded formatting structure 27. If the software in the billing structure 26 determines that the data collected for a particular call fails to meet the criteria for the preparation of a billing record, the data is simply purged from the system and nothing further is done. If, however, the billing structure 26 determines that a billing record should be prepared, the collected charging data is sent on to the hard coded formatting structure 27, which determines how the bill will actually be assembled and prepared for rendition to the customer. Finally, an output block 28 sends the formatted billing information to an intended destination such as the automatic message accounting system within the exchange. As discussed above, prior art billing record software systems such as that shown in FIG. 2, are hard coded and include virtually no flexibility as to their ability to decide whether or not a billing record should be prepared in the first place and, secondarily, the criteria for charging and the format for assembling a billing record to be used to render a bill to a customer. Such prior billing systems require rewriting and reloading of the software into the charging system 22 in order to modify the billing procedures which are to be used in the exchange.

In contrast to prior art billing record systems, the software system of the present invention gives to individual telecommunications administrations the ability to define the specific conditions under which a billing record is to be output in the first place and, in addition, to define the charging criteria, and to decide which data is to be output in a charging detailed record and the representation of that output. Further, the present system enables additional data to be readily added to billing record structures by the appending of other modules to these records as well as the selection of the particular output method of each record. The system of the present invention also enables the output of charging data for new features as they are added to the exchange so that they may be charged for before the release of new charging software. The administrative control of charging output records is herein referred to as filtering to incorporate the concept of filtering out the unwanted call records from the charging data collected.

One of the principal features of the system of the present invention is that of allowing the flexible formatting of the structure of the charging record to that which is desired by the each telecommunications administration. This feature is implemented by the use of individual modules in the formatting of call detailed charging records. The records can be comprised of a series of data modules which form records of fixed lengths, additional modules appended to a basic fixed length record, or a series of modules which form records of no fixed length. Billing record modules in the present system can be custom configured from any data fields contained in a master list and/or new data generated by new features supported by the exchange. The data contained within each module comprising a charging record relate to the specific services that are provided by the exchange on each call. New data generated by new features are output in one or more modules which are appended to a fixed length record format or assembled to form a record without any fixed length.

Billing record function is initiated in the system of the present invention by charging analysis and data of interest for charging is collected for each call and analyzed to determine if a charging record(s) is to be output and what structure(s) the record(s) should have. The system incorporates a sequence of pointers to lead to the appropriate blocks of software for each subsequent stage of analysis employed from the beginning of the charging analysis to the output of the billing record(s). The system includes operator terminals and administration interface blocks to enable individual telecommunications administrations to construct and/or modify each of the analysis criteria to satisfy the individual needs and customs of its individual market.

Figure 3:
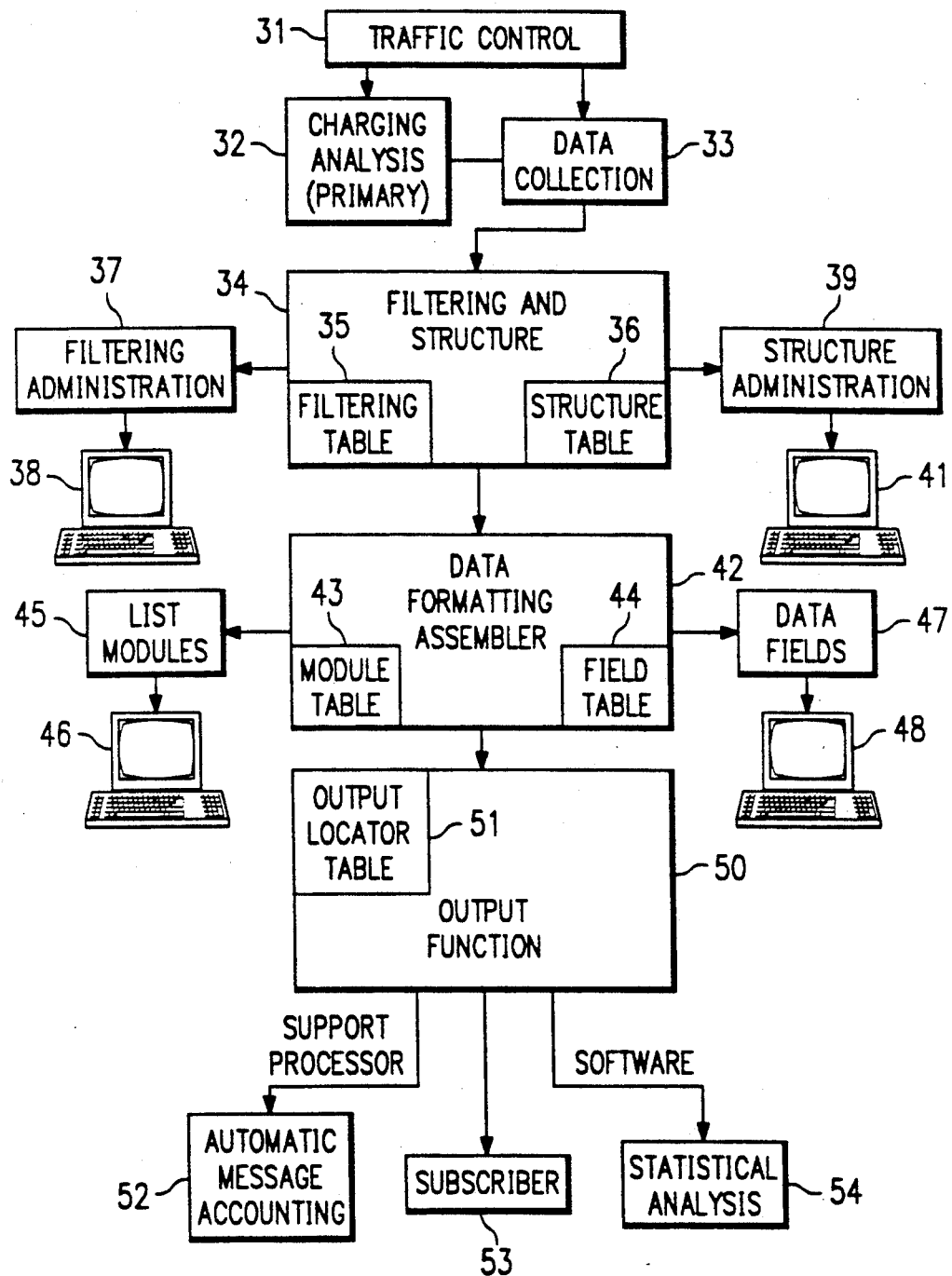
FIG. 3 is a block diagram of a billing record structure constructed in accordance with the present invention.

Referring now to FIG. 3, there is shown a block diagram of a billing system constructed in accordance with one embodiment of the system of the present invention. It should be understood that each of the blocks shown in FIG. 3 are software blocks and are contained within the charging system of the exchange within which the system of the present invention is incorporated. A traffic control block 31 supplies data for each call taking place within the exchange to both a primary charging analysis block 32 as well as a data collection block 33. The charging analysis block 32 performs numerical analysis on the data received from the traffic control block 31 and assembles the relevant data in a data collection block 33. In general, all billing data possible to be collected on a particular call is collected for each call. These data are generally standardized within the exchange and consist of many different parameters related to each call, such as: A-number; B-number; C, D, or E-numbers; call origination time; call termination time, length of call, special features implemented during the call, etc.

The data collected by block 33 is sent to a filtering and structure block 34 which includes a filtering table 35 and a structure table 36. The filtering and structure block 34 analyzes the call data in accordance with established criteria to determine whether or not a billing record should be prepared on each particular call and, if so, determines the format in accordance with which that billing record should be assembled. The filtering and structure block 34 is connected to a filtering administration block 37 which is controlled by an operator terminal 38. Similarly, the filtering and structure block 34 is also connected to a structure administration block 39 which is connected to an administration terminal 41. The filtering administration block 37 includes interface software which enables, respectively, the operator terminals 38 and 41 to provide input to the filtering and structure block 34 to change the basic criteria upon which the decision to prepare a billing record is rendered. Similarly, the structure administration block 39 allows the telephone exchange administration to input, by means of the terminal 41, changes and modifications of the structure in accordance with which a billing record is to be assembled. For example, commands at terminal 38 may be used to establish filtering conditions which are then used to determine whether or not the data produced by a specific call or event should be output in the form of a billing record structure. By way of example, the following filtering conditions may be specified from the terminal 38 through the filtering administration block 37:

(a) status of the call (for example, answered or unanswered);
(b) originating subscriber characteristics (e.g., originating subscriber line usage study);
(c) whether the call is made on ISDN network;
(d) whether or not the call includes ISDN information elements;
(e) whether there is a charge for the use of a particular feature (e.g., automatic call-back);
(f) whether the call includes the use of directory assistance;
(g) whether the call involved the use of unanswered call recording;
(h) whether there are terminating subscriber characteristics (e.g., free terminating service);
(i) whether there are special charging considerations (i.e., the use of chargeable services such as charging checks);
(j) whether the call included a high cost call;
(k) whether the call included a long duration call;
(l) whether there are chargeable ISDN user to user messages;
(m) whether the call was service observed;
(n) defines which is a charged party.

A parameter also exists among these to disallow any modules from being appended to the billing record of the call.

In a similar way, the structure administration 39 allows the terminal 41 to specify a command defined structure which is used to determine, in the event a record is to be assembled, what data should be included within the record and what structure the charging record should have. This structure also specifies the location to which the assembled record is to be output. The resulting structures may be changed and modified depending upon the combinations of structure parameters specified by the commands input through terminal 41. By way of example, the following exemplary structuring conditions may be specified by command by the operator of terminal 41 via the structure administration blocks 39:

(a) status of the call (e.g., answered or unanswered);
(b) originating subscriber characteristics (e.g., originating subscriber line usage studies);
(c) whether the call includes charging information related to the use of a particular feature;
(d) whether the call includes WATS administration;
(e) whether the call includes terminating subscriber characteristics;
(f) whether the call includes special charging considerations for example (e.g., the use of chargeable services);
(g) the charged party; and
(h) whether switch supervisory unit is requested.

In the event the filtering and structure block 34 determines that, based upon the flexibly programmed criteria, a charge record is to be made for the call, the collected data is then sent to the data formatting assembler 42 which includes a module table 43 and a field table 44. The data formatting assembler block 42 is also connected to a modules list 45 which can be modified by means of an operator terminal 46 along with a data fields block 47 which can also be modified by an operator terminal 48. A list of modules is prepared by an operator via the terminal 46 to define a collection of particular modules which may form parts of billing records which are initiated in the exchange by command. Module lists may be added to an exchange by a command, modified by a command, and deleted from the exchange by a command. Each module is made up of a group of data fields which are also defined by command from the terminal 48 and assembled and defined within the data fields block 47. Depending upon the different conditions set within the system, as described above, the call data is assembled into a specific call record having a specified structure and including specific information which has been preselected by the administration. Thus, each type of call or each call having specified characteristics may be placed into a particular structure or record depending upon the particular needs of the particular telecommunications administration.

After the record has been assembled by means of the data formatting assembler block 42, the assembled record is output to the output function block 50 which includes an output locator table 51. The output function block 50 selects from a plurality of possible output locations, in accordance with data stored in the output locator table 51 which, based upon operator specified criteria, provide that the assembled billing record is to be output to a particular location. For example, such a location might include a support processor associated with an automatic message accounting block 52, a subscriber block 53 or the software associated with a statistical analysis block 54.

As can be seen, the software system of the present invention includes a provision for first filtering the collected data from a call to determine whether or not a call record should be prepared and, if so, the structure which should be used. Thereafter, the data is forwarded to a data formatting assembler 42 which then assembles the billing record in accordance with the preselected structure and forwards it on to the output function block 50 which produces the charging record and delivers it to the desired location.

As described above, the filtering and structure block 34 includes a filtering table 35 which is used to initially determine from the recorded call data whether or not a call record should be produced. Referring next to FIG. 4, there is shown an illustrative diagram 71 of the filtering table criteria of the type employed in filtering table block 35 of filtering and structure block 34. The entries in such a filtering table are basically used as masks to specify the various paths which the analysis of the call data follows to determine whether or not a record should be made of the call. For example, entries in the filtering table might lead to an inquiry of whether the call was answered or unanswered, various conditions related to subscriber originating studies, and various feature charging policies of the administration. It should be understood that many different combinations of masks could be assembled and such a table is custom configured to match the individual requirements of a particular telephone administration. It is also readily modified through the filtering administration 37 under control of the terminal 38 to whatever conditions are desired for whatever period of time is selected.

As also discussed above, the filtering and structure block 34 includes a structure table 36 which is used to define the particular structure of the charging record which is to be assembled. Referring to FIG. 5, there is shown an illustrative diagram 72 of the structure criteria of the type employed in the structure table block 36 of filtering and structure block 34 which is also in the form of mask entries which specify through data analysis the particular structure and output location of a billing record structure if such is to be generated. For example, entries in the structure table might lead to whether the originating subscriber had complained about his bill to the point of the administration wanting to place into the structure of his billing record each and every detail of all his calls or whether the call included an invocation of a particular type of special service for which certain call details should be given on the billing record format. It should also be understood that the selection of various structures of a billing record are specified through the input of the user through terminal 41 and the structure administration block 39 to specify particular formats.

The data formatting assembler 42 includes a field table block 44, as discussed above. Referring now to FIG. 6, there is shown a field table 60 which illustratively represents the field arrays within which data fields are assembled within the system of the present invention. For example, each field table includes one or a plurality of data field definitions and field 61 might include a field number identifying that particular field, a specification of the length of that particular field, as well as the data type to be included within that field. Each field and each field table is selectively defined by means of the terminal 48 so that any particular fields may be custom specified in accordance with the individual requirements of the administration.

The data formatting assembler 42 also includes a module table 43 as was discussed above. FIG. 7 is illustrative of a module table 62 which defines the groupings of data fields which make up one or more tables of fields which are used to assemble a particular billing record module. For example, the structure of illustrative module 62, may specify that field table 1 be listed first followed by field table 3 and others and up and to including field table 100. Such module tables are predefined in module list block 45 via user input through terminal 46. This allows the assemblage of selectively configured billing record modules based upon the individual application requirements of the administration through use of the preassembled field tables illustrated by field table 60.

Referring next to FIG. 8 there is shown an illustrative block of a call charging record being assembled which is shown to comprise a plurality of field tables 81 (each consisting of individual fields of call data) making up a particular module 82 followed by a second module 83 and a third module 84 each of which are made up of a plurality of field tables 85 and 86. In this way, fields of data are assembled and specified to be included within a particular billing record. It should be also noted that module 87 can be defined to itself consist of a plurality of preassembled submodules within a billing record structure. In general, prior art billing records consist of fixed length blocks of data. It should be noted that a charging record assembled in accordance with the systems of the present invention may be of the same length as a prior art record and externally appear to be identical. However, the contents of the data within that record are individually selectable as discussed above. In addition, a record assembled by the present system may consist of a fixed length record to which additional modules have been appended or of only a sequence of modules as described above. Each module can include a module code as the first field thereof to facilitate administrative handling, such as to denote the last module appended to a record.

Figure 9A:
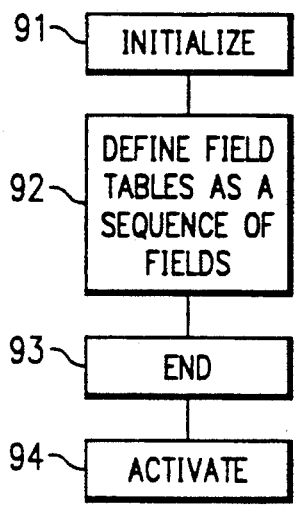
FIGS. 9A-9D illustrate, respectively, flow charts of methods with which the billing parameters used in the system of the present invention are defined and modified.

Referring now to FIG. 9A there is shown a flow chart illustrating the manner in which the field tables 44 within the data formatting assembler are defined. A plurality of fields, each including an identifying field number, are defined with each field being a sequence of data items to be included within a charging record. As illustrated in FIG. 9A, the system is initialized at 91 and thereafter, at 92, a particular field table is defined as a sequence of specified fields. Next, another field table is defined as a different specified sequence of fields, and so forth until all of the field tables required for the particular structural configuration have been specified. Thereafter, at 93 the system ends and once the field tables are assembled, they are activated for use within the system at 94.

Figure 9B:
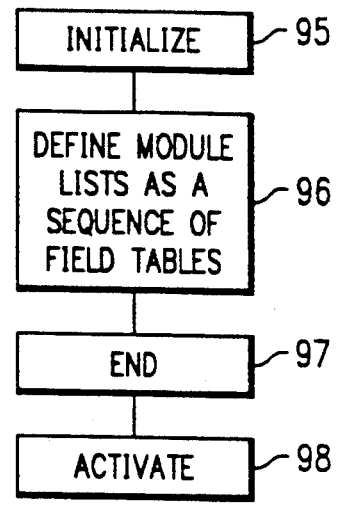

Next at FIG. 9B there is shown a flow chart illustrating the manner in which module lists are assembled within the system of the present invention. In that routine, the system is first initialized at 95 and thereafter at 96 a plurality of module lists are defined, each module being comprised of a sequence of field tables. A plurality of different modules consisting of different arrangements of field tables are assembled until all of the modules required for the particular formatting assembler are structured. Thereafter, the routine ends at 97 and the lists are activated for use within the system at 98.

Figure 9C:
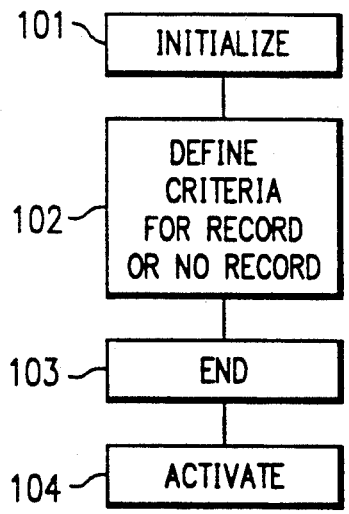

At FIG. 9C there is shown a flow chart illustrating the manner in which criteria are selectively defined to configure the filtering table used to reach the decision of whether or not a record should be generated for a particular call. In that routine, the system is initialized at 101 and then at 102 the record creation criteria are specified and/or modified. These criteria are, of course, defined via the filtering administration 33 in the form of a filtering table 35. Once all of the criteria are defined, the system ends at 103 and is activated for use in the system at 104.

Figure 9D:
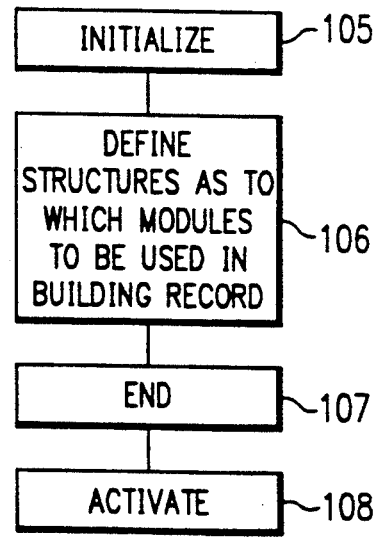

Similarly, at FIG. 9D there is shown a flow chart illustrating the assembly of the various charging record structures through the specification of which modules are to be used in building a record under particular conditions. As illustrated in FIG. 9D, the routine begins at 105 with initialization of the system and moves to 106 at which structures are defined as to the modules which are to be used in building the record under different call data determined conditions. When all of the structures have been assembled, the routine ends at 107 and the structure table is activated for use within the system at 108.

As can be seen from the routines of FIGS. 9A-9D, the administration of the system may, through terminals 38, 41, 46 and 48, create a highly flexible definition of the various criteria based upon which a record is to be prepared as well as the structure of that record through the individual specification of particular fields and modules from which a record is to be assembled.

Figure 10:
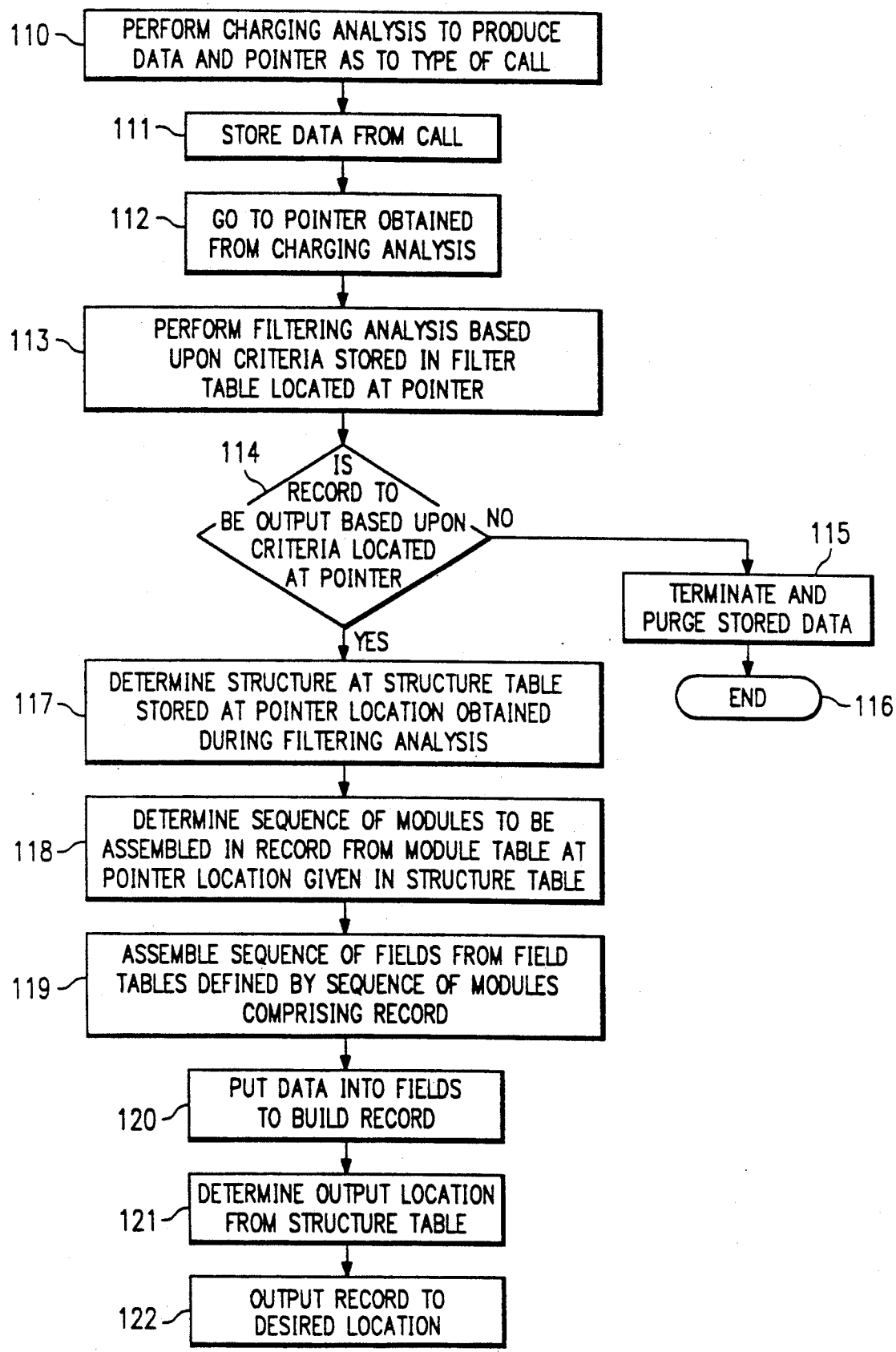
FIG. 10 is a flow chart illustrating one embodiment of the operation of the system of the present invention.

Referring next to FIG. 10, there is shown a flow chart illustrating the overall operation of one embodiment of the system of the present invention. The system begins at 110 by performing charging analysis to produce call data and a pointer as to the particular type of call based upon that analysis. Next, the system moves to 111 at which the data from the call is stored and from there to 112 at which the system moves to the pointer obtained from the charging analysis at 110. Once the system reaches the pointer at 113 it performs filtering analysis based upon the criteria stored in the filter table located at the pointer. Based upon that analysis, the system moves to 114 at which a decision is made as to whether or not a record is to be output based upon the filtering analysis performed at 113. If not, the system moves to 115, the routine is terminated and the stored data is purged from the system to end the routine at 116. If however, a record is to be prepared based upon the results of the filtering analysis governed by the criteria located at the pointer obtained from the charging analysis, the system obtains a new pointer to a specified structure table for analysis and moves to 117 to determine the structure at the structure table stored at the pointer location obtained during the filtering analysis. Once the structure analysis pointer location is reached the system moves to 118 to determine the sequence of modules to be assembled in the record from the module table at a next pointer location given in the structure table. Thereafter, at 119, the system assembles the sequence of fields from the field tables defined by the sequence of modules comprising the record to be assembled. Once the sequence of fields is assembled, the system moves to 120 to put the call data specified into the fields comprising the modules in the module list in order to build the record. At 121 the location to which the record is to be output is determined from the structure table. Finally, at 122 the system outputs the record to the desired location(s).

As can be seen from the above description of the system of the present invention the system allows great flexibility as to the structure and call data to be included within a particular billing record as well as the decision as to whether or not a record is to be prepared is all. It is also to be seen that there is great flexibility in the ability of a telecommunications administration to be able to assemble the billing record criteria and structures from any criteria which they desire. It is also fast and easy to modify existing billing record criteria and/or billing record structures to incorporate any individual needs of that particular administration on very short notice. For example, in the case of an individual subscriber who has been complaining about his billing the system can be quickly modified to assemble that subscriber's complete billing record on every call in order to verify the billing. In addition, new features which are added to the system on very short notice may also be added to the billing record system at virtually the same time so that the administration does not lose revenue from a lack of charging for new features from which subscribers are receiving benefit.

The system of the present invention is configured to allow operators within a telephone administration to both create and modify the criteria used by the system to determine whether a billing record is to be generated and, if so, the structural format which is to be used for presentation of the call data in the billing record. An operator accomplishes these tasks by entering a series of commands and specifications into the terminals associated with the present system in order to define each of these criteria. In order to more fully explain the manner in which this is done in the present system, a series of exemplary commands are set forth below.

Figure 11A:
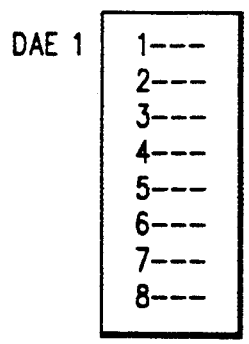
FIG. 11A is an illustrative exemplary field table used in the system of the present invention.

First, in order to define a field table in accordance with the system of the present invention (and in accordance with the procedures shown in FIG. 9A) an operator might enter the following exemplary series of commands:

FRMPI:DAE=1;
FRMSI:FIELD=1,LENGTH=8,DATY=BCD;
FRMSI:FIELD=2,LENGTH=2,DATY=BCD;
FRMSI:FIELD=3,LENGTH=6,DATY=BCD;
FRMSI:FIELD=4,LENGTH=4,DATY=BCD;
FRMSI:FIELD=5,LENGTH=4,DATY=BCD;
FRMSI:FIELD=6,LENGTH=8,DATY=BCD;
FRMSI:FIELD=7,LENGTH=4,DATY=BCD;
FRMSI:FIELD=8,LENGTH=8,DATY=BCD;
FRMPE;

In the first command, Flexible Record Module Definition Procedure Initiate (FRMPI), a field table is defined as Definition Analysis Entry (DAE) number 1. In the next eight commands, Flexible Record Module Definition Specification Initiate (FRMSI), a series of data fields, 1-8, are specified by field number, character length, and type of data to be used in that field within the output record. It should be understood that there is a master list of field numbers which identify; by a unique number; each and every possible item of call data which could be included within a billing record. It is these field numbers which are used to designate each field in the field tables. In addition, an operator can assign other literal data a literal designation which will be used instead of the field number to be directly included in the billing record, e.g., "CREDIT CARD NUMBER". The final command, Flexible Record Module Definition Procedure End (FRMPE), terminates the specification of DAE 1. An illustrative diagram of this exemplary field table is shown in FIG. 11A.

Figure 11B:
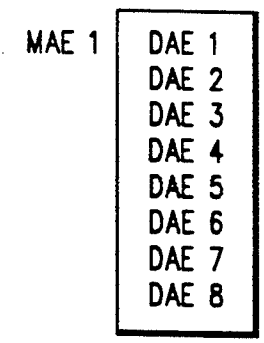
FIG. 11B is an illustrative exemplary module table used in the system of the present invention.

Once the requisite field tables are constructed in accordance with the system of the invention, the operator might design a module list table (in accordance with the procedures shown in FIG. 9B) by entering the following exemplary series of commands:

FRLPI:MAE=1;
FRLSI:DAE=1&&8;
FRLPE;

In the first command of this series, Flexible Record Module List Procedure Initiate (FRLPI), a module table is defined as Module Analysis Entry (MAE) number 1. In the next command, Flexible Record Module List Specification Initiate (FRLSI), a sequential series of field tables, DAE 1-8, are specified as comprising the first module table. The final command, Flexible Record Module List Procedure End, terminates the specification of MAE An illustrative diagram of this exemplary module table is shown in FIG. 11B.

Figure 11C:
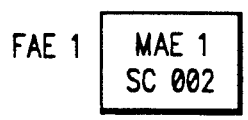
FIG. 11C is an illustrative exemplary structure table used in the system of the present invention.

When the requisite module tables have been constructed in accordance with the system of the invention, the operator might then design a structure table (in accordance with the procedures shown in FIG. 9D) by entering the following exemplary command:

FRFSI:FAE=1,MAE=1,SC=002;

This command, Flexible Record Format Specification Initiate, defines Format Analysis Entry (FAE) number 1 as comprising a single module table, MAE 1, which is given a Structure Code (SC) number of 002 to define that particular module in the billing record being assembled. An illustrative diagram of this illustrative structure table is shown in FIG. 11C.

Figure 11D:
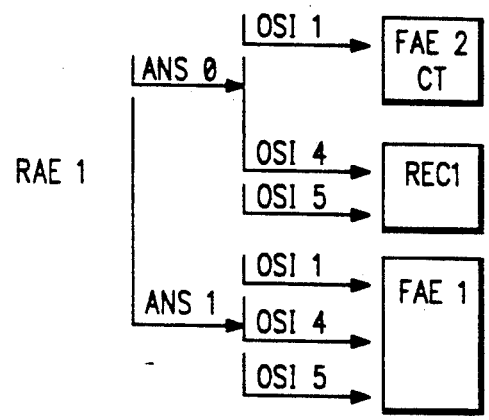
FIG. 11D is an illustrative exemplary filtering table used in the system of the present invention.

Having defined illustrative portions of the billing record structure the operator might next specify portions of the filtering criteria to be used in the system of the present invention (in accordance with FIG. 9C) by entering the following exemplary series of commands:

FRRPI:RAE TM 1;
FRRSI:FILT=ANS-0&OSI-1,FAE=2;
FRRSI:FILT=OSI-4&-5,REC=1;
FRRSI:FILT=ANS-1&OSI-1&-4&-5,FAE=1;
FRRPE;

The first of these commands, Flexible Record Recording Procedure Initiate (FRRPI), defines Record Analysis Entry (RAE) number 1. In the next command of this series, Flexible Record Recording Specification Initiate (FRRSI), a first set of filtering table criteria are defined as an unanswered call (ANS-0) occurring with an Originating Subscriber Indicator.(OSI) representative of a line usage study in progress (OSI-1) which yields a pointer to a particular format analysis entry (FAE 2) structure table. The third command sets forth a second set of filtering table criteria which are defined as the occurrence of an unanswered call together with data indicative of both complaint observation (OSI-4) and unanswered call recording (OSI-5) in effect. Satisfaction of these filtering criteria leads to a decision of not to record the call (REC=1). In the fourth command in the sequence, a third set of filtering table criteria are defined as an answered call (ANS-1) occurring with a line usage study, complaint observation, and unanswered call recording each in effect as originating subscriber indicators. Satisfaction of these criteria yields a pointer to a different format analysis entry (FAE 1) structure table. An illustrative filtering table structure is shown in FIG. 11D.

It should be understood that the commands given above are purely illustrative and others could be used depending upon the particular software design. In addition, other types of commands than those exemplified could be used in the system, such as those configured to activate a series of commands, remove commands, deactivate commands, print the commands, or respecify commands within the system. The commands entered by the operator construct and configure the various fields and tables discussed above within the data store of the system. The data store is then accessed by the billing record generation software to create a billing record in accordance with the present invention.

Figure 11E:
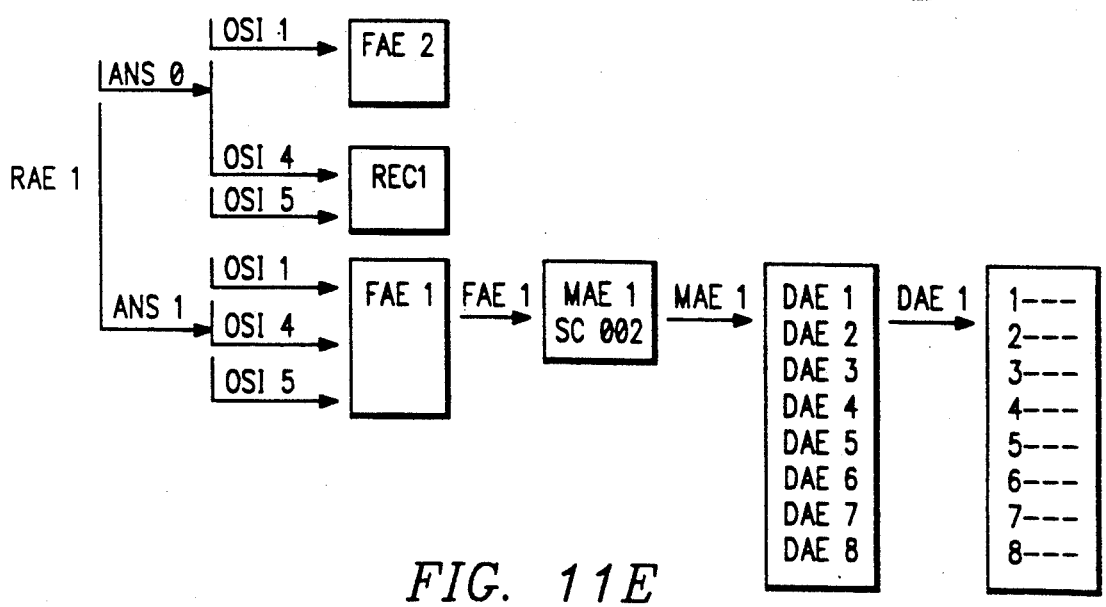
FIG. 11E is a composite of the above.

FIG. 11E shows an illustrative diagram of the manner in which the system of the invention process call record data employing the purely exemplary processing criteria set forth above (in accordance with FIG. 10). When call data are sent through record analysis entry number 1 (RAE 1) the criteria of whether or not the call was answered is address in the two branches ANS 0 (unanswered) and ANS 1 (answered). If, unanswered (ANS 0) and the originating subscriber indicating criteria for a line usage study is present (OSI 1) the call is to be recorded and the system proceeds in accordance with the format defined in structure table FAE 2. If, however, the call is unanswered and the originating subscriber indicating criteria for both complaint observation and unanswered call recording are present (OSI 4 & OSI 5) then no call billing record is to be prepared and the call data is discarded. When the call data contain an indication that the call was answered (ANS 1) the filtering parameters calling for the presence of originating subscriber indicating criteria of a line usage study (OSI 1), complaint observation (OSI 4) and unanswered call recording (OSI 5) are all present the call is to be recorded and the system moves to the pointer given as a result of the filtering analysis, i.e., FAE 1. Following this pointer leads to analysis in a structure table which produces another pointer (MAE which leads to the module table which specifies the field tables (DAE 1-DAE 8) to be used in the billing record of the call. Each field table includes a plurality of fields, only one of which (1-8) are shown. Thereafter the corresponding data components to fill the appropriate fields specified for the billing record are assembled and forwarded to the location specified.

While it is believed that the operation and construction of the system of the present invention will be apparent from the foregoing description, the method of operation and structure of the system shown and described has been characterized as being preferred and obvious changes and modifications may be made therein without departing from the spirit and scope of the invention as defined in the following claims.

What is claimed is:

1. A method of providing a billing record system for use within the charging system of a stored program controlled communications exchange operated by a telecommunications administration, said charging system performing charging analysis and producing a collection of data from each call within the exchange, said method comprising:

constructing a call data filtering software block which includes a filtering table for reaching a decision as to whether or not a call record is to be produced for each call based upon conditions determined by the call data associated therewith;

enabling the telecommunications administration operating said exchange to interface with said filtering software block and modify said filtering table in accordance with specific conditions selected by said administration; and creating a separate billing record for each call the data of which satisfies the conditions specified within the filtering table.

2. A method of providing a billing record system for use within the charging system of a stored program controlled communications exchange as set forth in claim 1 wherein said call data filtering software block has associated therewith a structure software block which includes a structure table for specifying the particular structure to be used for each call record to be produced based upon conditions determined by the data associated with each call and in which said method also includes the step of:

enabling the telecommunications administration operating said exchange to interface with said structure software block and modify said structure table in accordance with specific conditions selected by said administration.

3. A method of providing a billing record system for use within the charging system of a stored program controlled communications exchange as set forth in claim 2 which also includes:

constructing a call data formatting assembler for assembling the data related to each call for which a record is to be created into a record comprising an array of modules having a specific structure determined from said structure table and which includes a plurality of field tables, each of which specifies a plurality of fields comprising call data available to be included within a call record and a plurality of module tables, each of which specifies a plurality of field tables available for use within a call record to be assembled; and enabling the telecommunications administration operating said exchange to interface with said formatting assembler and modify said field tables and said module tables in accordance with specific requirements selected by said administration.

4. A method of providing a billing record system for use within the charging system of a stored program controlled communications exchange as set forth in claim 3 which also includes the step of:

providing within the structure table of said call data structure software block an indication of the location to which each billing record to be created is to be output by said charging system;

storing said output location indicator from said structure table to an output locator table;

sending each assembled billing record to the location specified within said output locator table.

5. A method of providing a billing record system for use within the charging system of a stored program controlled communications exchange as set forth in claim 4 wherein said record is output to a support processor.

6. A method of providing a billing record system for use within the charging system of a stored program controlled communications exchange as set forth in claim 4 wherein said record is output to a subscriber location.

7. A method of providing a billing record system for use within the charging system of a stored program controlled communications exchange as set forth in claim 4 wherein said record is output to a statistical analysis software block.

8. A method of providing a billing record system for use within the charging system of a stored program controlled communications exchange as set forth in claim 1 wherein said conditions based upon which a call record is to be produced include whether or not the call was answered.

9. A method of providing a billing record system for use within the charging system of a stored program controlled communications exchange as set forth in claim 2 wherein said conditions based upon which the structure for a call record is to be specified include the use of particular subscriber features.

10. A system for providing a billing record system for use within the charging system of a stored program controlled communications exchange operated by a telecommunications administration, said charging system performing charging analysis and producing a collection of data from each call within the exchange, said system comprising:

a call data filtering software block which includes a filtering table for reaching a decision as to whether or not a call record is to be produced for each call based upon conditions determined by the call data associated therewith;

means for enabling the telecommunications administration operating said exchange to interface with said filtering software block and modify said filtering table in accordance with specific conditions selected by said administration; and means for creating a separate billing record for each call the data of which satisfies the conditions within the modified filtering table.

11. A system for providing a billing record system for use within the charging system of a stored program controlled communications exchange as set forth in claim 10 wherein said call data filtering software block has associated therewith a structure software block which includes a structure table for specifying the particular structure to be used for each call record to be produced based upon conditions determined by the data associated with each call and in which said system also includes:

means for enabling the telecommunications administration operating said exchange to interface with said structure software block and modify said structure table in accordance with specific conditions selected by said administration.

12. A system for providing a billing record system for use within the charging system of a stored program controlled communications exchange as set forth in claim 11 which also includes:

a call data formatting assembler for assembling the data related to each call for which a record is to be created into a record comprising an array of modules having a specific structure determined from said structure table and which includes a plurality of field tables, each of which specifies a plurality of fields comprising call data available to be included within a call record and a plurality of module tables, each of which specifies a plurality of field tables available for use within the a call record to be assembled; and means for enabling the telecommunications administration operating said exchange to interface with said formatting assembler and modify said field tables and said module tables in accordance with specific requirements selected by said administration.

13. A system for providing a billing record system for use within the charging system of a stored program controlled communications exchange as set forth in claim 12 which also includes:

means for providing within the structure table of said call data structure software block an indication of the location to which each billing record to be created is to be output by said charging system;

means for storing said output location indicator from said structure table to an output locator table;

means for sending each assembled billing record to the location specified within said output locator table.

14. A system for providing a billing record system for use within the charging system of a stored program controlled communications exchange as set forth in claim 13 wherein said record is output to a support processor.

15. A system for providing a billing record system for use within the charging system of a stored program controlled communications exchange as set forth in claim 13 wherein said record is output to a subscriber location.

16. A system for providing a billing record system for use within the charging system of a stored program controlled communications exchange as set forth in claim 13 wherein said record is output to a statistical analysis software block.

17. A system for providing a billing record system for use within the charging system of a stored program controlled communications exchange as set forth in claim 10 wherein said conditions based upon which a call record is to be produced include whether or not the call was answered.

18. A system for providing a billing record system for use within the charging system of a stored program controlled communications exchange as set forth in claim 11 wherein said conditions based upon which the structure for a call record is to be selected include the use of particular subscriber features.

19. A method of providing a billing record within the charging system of a stored program controlled communications exchange operated by a telecommunications administration, said method comprising:
    performing charging analysis of each call and producing data and pointers to first and second locations based upon the type of call;
    storing the data produced from the charging analysis of said call;
    obtaining a set of criteria from the first location specified by said pointer;
    performing filtering analysis based upon said set of criteria and determining whether or not a charging record should be produced for said call;
    determining, in response to a decision that a charging record should be produced for the call, the structure for said record from a structure table stored at said second location indicated by said pointers;
    assembling a charging record from said stored call data in the structure specified by said structure table; and
    enabling the telecommunications administration operating said exchange to interface with and modify said set of criteria stored at said first location for determining whether or not a charging record should be produced for said call.

20. A method of providing a billing record within the charging system of a stored program controlled communications exchange operated by a telecommunications administration as set forth in claim 19 which includes the additional step of:
    enabling the telecomminications administration operating said exchange to interface with and modify said set of criteria contained within said structure table stored at said second location for determining the structure of each charging record to be produced.

21. A method of providing a billing record within the charging system of a stored program controlled communications exchange operated by a telecommunications administration as set forth in claim 19 wherein said step of assembling a charging record from said stored call data includes the additional steps of:
    determining the sequence of modules to be assembled in the call record from a module table stored at a third location specified by a third pointer contained in said structure table;
    determining the sequence of data fields to be assembled in each module of the call record from field tables stored at a fourth locations specified by a fourth pointer contained in said module table.

22. A method of providing a billing record within the charging system of a stored program controlled communications exchange operated by a telecommunications administration as set forth in claim 21 which includes the additional step of:
    enabling the telecomminications administration operating said exchange to interface with and modify the contents of said module table stored at said third location.

23. A method of providing a billing record within the charging system of a stored program controlled communications exchange operated by a telecommunications administration as set forth in claim 21 which includes the additional step of:
    enabling the telecomminications administration operating said exchange to interface with and modify the contents of said field table stored at said fourth location.

24. A method of providing a billing record within the charging system of a stored program controlled communications exchange operated by a telecommunications administration as set forth in claim 19 which includes the additional step of:
    determining the location to which the assembled charging record should be sent from information stored with said structure table at said second location; and
    sending said charging record to the specified location.

25. A method of providing a billing record within the charging system of a stored program controlled communications exchange operated by a telecommunications administration as set forth in claim 24 which includes the additional step of:
    enabling the telecomminications administration operating said exchange to interface with and modify said specified locations contained within said structure table stored at said second location to which each charging record produced should be sent.

* * * * *